United States Patent [19]
Tanaka et al.

[11] Patent Number: 5,622,998
[45] Date of Patent: Apr. 22, 1997

[54] DEPOLYMERIZED NATURAL RUBBER AND PROCESS FOR PREPARATION THEREOF

[75] Inventors: Yasuyuki Tanaka, Tokyo; Toshiaki Sakaki; Atsuko Kawasaki, both of Hyogo; Masaharu Hayashi, Wakayama; Eiji Kanamaru, Tokyo; Kazuhiko Shibata, Osaka, all of Japan

[73] Assignees: Sumitomo Rubber Industries, Ltd., Hyogo; Kao Corporation; Fuji Latex Co., Ltd., both of Tokyo; Nitto Denko Corporation, Osaka, all of Japan

[21] Appl. No.: 527,322

[22] Filed: Sep. 12, 1995

[30] Foreign Application Priority Data

Sep. 14, 1994 [JP] Japan ................... 6-220538

[51] Int. Cl.⁶ ............... C08J 3/09; C08C 1/00
[52] U.S. Cl. ............ 521/41; 524/575.5; 526/340.2; 528/490
[58] Field of Search ............... 528/931, 930, 528/932, 934, 936, 937, 490; 521/41; 526/340.2; 47/10; 524/575.5

[56] References Cited

U.S. PATENT DOCUMENTS 2,061,276  11/1936  Ingmanson ............... 528/932
3,313,793   4/1967  De LaMare ............... 525/370
4,549,897  10/1985  Seng et al. ............... 71/3

FOREIGN PATENT DOCUMENTS 1570792   2/1970  Germany.
6607905  12/1967  Netherlands.
 417912  11/1934  United Kingdom.

Primary Examiner—Paul R. Michl
Assistant Examiner—Olga Asinovsky
Attorney, Agent, or Firm—Birch, Stewart, Kolasch & Birch, LLP

[57] ABSTRACT

A depolymerized natural rubber having a number-average molecular weight of from 2,000 to 50,000 obtained by the depolymerization of a deproteinized natural rubber. A process for the preparation of a depolymerized natural rubber comprises dissolving a deproteinized natural rubber into an organic solvent so as to give a concentration of from 1 to 30% by weight and then carrying out air oxidation of the resulting solution in the presence of a metallic catalyst. The depolymerized natural rubber can provide the same physical properties as ordinary vulcanized rubbers, exhibits no odor or color characteristic to natural rubbers and causes no immediate allergy induced by protein.

20 Claims, No Drawings

DEPOLYMERIZED NATURAL RUBBER AND PROCESS FOR PREPARATION THEREOF

FIELD OF THE INVENTION

The present invention relates to a depolymerized natural rubber useful as a raw material for adhesives, sealants, calking compounds, plasticizers, polyurethane or the like and a process for the preparation thereof.

BACKGROUND OF THE INVENTION

A depolymerized natural rubber obtained by the depolymerization of a natural rubber is also called a liquid rubber. Because of its strong adhesivity and excellent crosslinking reactivity, the depolymerized natural rubber has found a wide application as a raw material for adhesives, sealants, calking compounds, and the like. It has also been used as a reactive plasticizer for improving the processing characteristics of solid rubbers such as compound rubber for tires.

Further, as compared to the case where a solid rubber is used, the processing procedure to produce rubber products can be eased by using a liquid rubber, and thus it is advantageous in view of energy consumption. For these reasons, a liquid rubber has been drawing considerable attention in various industrial applications.

However, since the prior art depolymerized natural rubber is made from a low purification natural rubber from which protein has not been sufficiently removed, it retains an odor characteristic of natural rubbers and causes coloration due to oxidation of the protein, etc. Accordingly, the prior art depolymerized natural rubber is disadvantageous in that it is seldom utilized as an adhesive for familiar products such as household articles and nursing articles or observable articles such as an adhesive for a photographic album which for such a purposed must be colorless and transparent. Moreover, the prior art depolymerized natural rubber may cause allergies induced by protein, which has recently become a problem, and thus such rubbers cannot be applied to products which when used are placed in contact with the human body.

In general, a depolymerized natural rubber can be obtained by subjecting a natural rubber to mastication, pyrolysis, photodecomposition, chemical decomposition or the like treatment. However, these treatments have the following disadvantages.

In the mastication process, a material rubber is subjected to processing by a roll mill or a closed mixer to break the rubber molecular chains by mechanical and thermal action. During this process, a loosening agent such as a mercaptan is added to the rubber to prevent the recombination of the rubber molecular chain thus broken, thereby accelerating the reduction of the molecular weight of the rubber. The loosening agent is an organic compound which gives a plasticity to the rubber in a small amount, thereby reducing the mastication time. This is also referred to as "mastication accelerator". This process can provide a depolymerized rubber having a uniform number-average molecular weight. However, the distribution of the molecular weight of the resulting depolymerized rubber is broad and the terminal structure of the resulting depolymerized rubber cannot readily be controlled.

The pyrolysis process is disadvantageous in that the reaction temperature is so high that not only decomposition but also crosslinking or recombination occurs, thus it is difficult to control the molecular weight distribution or the terminal structure.

In the photodecomposition process, a molecular chain is broken by the energy of light such as ultraviolet rays. However, peroxides or the like at ketone ends produced by breaking the main chain act as a sensitizer thereby causing sequential decomposition, hence it is difficult to control the terminal end, the molecular weight or its distribution. This process is also disadvantageous in that it facilitates an isomerization reaction that transforms cis-1,4 structure into trans-1,4 structure.

Known chemical decomposition processes include ozone degradation, oxidative degradation by an oxidizing agent such as hydrogen peroxide and phenylhydrazine, and oxidative degradation by a metallic ion catalyst. Ozone degradation should be effected at a low temperature. Further, since it is dangerous to use an ozone in a large amount as required in the degradation process, this process is used only as an analytical method and is not industrially valuable.

Production of a depolymerized natural rubber by oxidative decomposition with hydrogen peroxide or phenylhydrazine has been industrialized. In this regard, "Polymer Digest", page 90, October (1981) discloses a molecular weight-reduced natural rubber latex. It is reported that this rubber latex is a product of the oxidative depolymerization of a natural rubber latex with hydrogen peroxide. However, this product is not sufficiently liquefied but rather is a solid. Further, the ends of the molecular chain of this product are not substituted with functional groups. Similar examples can be seen in JP-A-58-152075 (The term "JP-A" as used herein means an "unexamined published Japanese patent application") wherein it is disclosed that a depolymerized natural rubber is obtained by adding hydrogen peroxide to a natural rubber latex, and then allowing the mixture to react while blowing oxygen thereinto. The result is a solid rubber having a break strength of 3.5 kg.

On the other hand, "Rev. Gen. Caoutch Plast", vol. 61, No. 643, page 79 (1984) discloses a technique which comprises the depolymerization of a natural rubber latex with phenylhydrazine and air to obtain a depolymerized natural rubber having a molecular weight of from 3,000 to 20,000. As evident from "Makromol. Chem.", vol. 186, No. 12, page 2,441 (1985), such a depolyerized natural rubber is terminated by phenylhydrazine and thus possesses no reactivity which is necessary for the extension of the main chain. Further, it was reported in "Makromol. Chem. Rapid Commun.", vol. 7, No. 3, page 159 (1986) that a liquid rubber having a molecular weight of 10,000 or less and a molecular weight distribution as narrow as 1.6 or 1.7 as calculated in terms of Mw/Mn has been produced by adding hydrogen peroxide and methanol or tetrahydrofuran to a toluene solution of a natural rubber and then irradiating the resulting mixture with ultraviolet rays. However, it was later reported in "Makromol. Chem.", vol. 189, No. 3, page 523 (1988) that a re-examination of the process revealed that an intramolecular epoxide group had been erroneously assumed as the terminal hydroxyl group.

The present inventors' examination has also revealed that epoxidation and isomerization of the main chain occurred in the depolymerization reaction by irradiation with ultraviolet rays under the same conditions as above. Further, it was found that no functional groups such as a carbonyl group, a carboxyl group and a hydroxyl group were produced at the ends of the molecular chain. Moreover, the depolymerized natural rubber thus obtained had a molecular weight distribution as broad as 4 or more as calculated in terms of Mw/Mn (weight-average molecular weight/number-average molecular weight ratio), and the control thereof was difficult.

If the foregoing depolymerized natural rubber which is not terminated by functional groups at its molecular ends is crosslinked with sulfur or peroxide, crosslinking reactions occur in the molecule rather than at the molecular ends, thereby providing a crosslinked rubber having many free-terminal chains. Since these free-terminal chains do not contribute to the physical properties or rubber elasticity of the crosslinked rubber but impair the dynamic properties of the crosslinked rubber, such a crosslinked rubber is not useful for commercial products.

In order to overcome these disadvantages, it is necessary to use a liquid rubber terminated by functional groups at both molecular ends and carry out crosslinking with the use of a hardening agent having a functionality of 3 or more or to use a liquid rubber containing functional groups at three positions, i.e., at the both molecular ends and at an intramolecular position, and carry out crosslinking with the use of a bifunctional hardening agent to form a three-dimensional network.

In order to obtain a crosslinked rubber having a good rubber elasticity, it is preferred that its molecular weight distribution be as narrow as possible and its molecular chain be as flexible as possible, i.e., the depolymerized natural rubber must maintain the original microstructure of natural rubber as much as possible. This is because a depolymerized natural rubber can be applied for various uses on condition that it is able to exhibit physical properties equal to ordinary vulcanized rubbers by making it to have a three-dimensional network structure with the use of an appropriate hardening agent.

SUMMARY OF THE INVENTION

It is therefore an object of the present invention to provide a depolymerized natural rubber which provides the same physical properties as ordinary vulcanized rubbers, but exhibits no odor or color characteristic of natural rubbers and causes no immediate allergy induced by the presence of protein. The present invention is directed to a process for the preparation of such a depolymerized natural rubber.

It is another object of the present invention to provide a liquid depolymerized natural rubber containing functional groups at both ends thereof or at both ends thereof and also in the molecule and thus suitable for the production of a three-dimensional network structure with the use of an appropriate crosslinking agent (chain extender). The present invention also is concerned with a process for the preparation thereof.

The present inventors made extensive studies aiming at solving the foregoing problems. As a result, it was found that the use of a deproteinized and highly refined natural rubber as a raw material can prevent the production of odorous components or adverse coloring due to the decomposition of proteins contained in natural rubber during the depolymerization reaction as well as the occurrence of complicated side reactions due to impurities. It was also found that the uniform contact of such a highly refined natural rubber with air in the presence of an appropriate catalyst enables an efficient depolymerization of the natural rubber main chain.

Accordingly, a liquid depolymerized natural rubber is obtained which gives less odor, exhibits no color and causes no immediate allergy induced by protein. In addition, side reactions such as epoxidation of the main chain and isomerization has been reduced, which cause the deterioration of rubber elasticity to an extremely low level. Furthermore, to reduce the possibility of the occurrence of complicated side reactions, the depolymerized natural rubber contains at its molecular ends a carbonyl group (>C=O) which can be modified to a hydroxyl group or the like. A three-dimensional network structure can easily be formed by modifying the terminal carboxyl groups of the depolymerized natural rubber to hydroxyl groups and then carrying out crosslinking by a three functional crosslinking agent, although the carbonyl group itself can be used as a functional group. Moreover, a liquid depolymerized natural rubber having a narrow distribution of molecular weight is obtained.

The depolymerized natural rubber according to the present invention is a liquid rubber having a number-average molecular weight of from 2,000 to 50,000 obtained by the depolymerization of a deproteinized natural rubber.

If the number-average molecular weight of the depolymerized natural rubber exceeds this range, the depolymerized natural rubber cannot sufficiently become a liquid. On the contrary, if the number-average molecular weight of the depolymerized natural rubber falls below this range, a uniform distribution of molecular weight cannot be obtained, and thus the rubber is not useful.

The process for the preparation of a depolymerized natural rubber according to the present invention comprises dissolving a deproteinized natural rubber into an organic solvent so as to give a concentration of from 1 to 30% by weight, based on the weight of the resulting solution, and then carrying out air oxidation of the resulting solution in the presence of a metallic catalyst. In accordance with this process, depolymerization can efficiently proceed.

DETAILED DESCRIPTION OF THE INVENTION

The depolymerized natural rubber of the present invention contains one or less epoxy group produced by side reactions per one molecular chain and maintains the same high cis structure as in natural rubbers. Accordingly, rubber products obtained by crosslinking the depolymerized natural rubber of the present invention exhibit the physical properties equal to ordinary natural rubbers.

The carbonyl group at the ends of the molecular chain produced by the depolymerization process according to the present invention easily undergoes aldol condensation, followed by water elimination reaction. Accordingly, the depolymerized natural rubber of the present invention comprises as a main component a telechelic liquid rubber wherein a C=C bond, one carbon atom of which is substituted by a formyl group (—CHO) produced by the aldol condensation, is contained per one molecular chain and the both ends of the molecular chain are terminated by ketone groups.

A series of reaction processes from the oxidative decomposition of natural rubber through the formation of a telechelic liquid rubber will be described hereinafter.

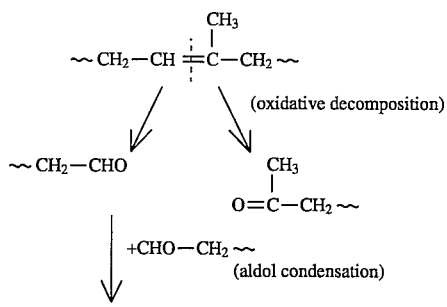

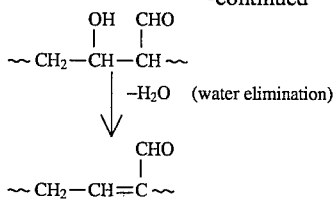

-continued
(water elimination)

In order to minimize the distribution of the molecular weight, it is preferred that the air oxidation of the deproteinized natural rubber is effected while vigorously shaking the solution so that the contact of the depolymerized natural rubber with air is increased.

The deproteinized natural rubber to be used as a raw material in the present invention can be prepared in accordance with a process as disclosed, for example, in JP-A-6-56902 (corresponding to EP-A-0 584 597). This process comprises adding a protease to a latex such as field latex and ammonia-treated latex to decompose the protein, and then repeatedly washing the latex with a surfactant to purify it. The washing is preferably effected by centrifugal separation.

The protease to be used for the deproteinization is not specifically limited. The protease may be one derived from bacteria, fungi or yeast. Among them, one derived from bacteria is preferred. In general, the decomposition by the protease may be carried out by adding the protease to a natural rubber latex in an amount of from 0.01 to 10% by weight and then allowing the resulting mixture to stand, or stirring, it for from several minutes to one week. The proteolysis treatment by protease is effected at a temperature of preferably from 5° to 90° C., more preferably from 20° to 60° C.

The foregoing surfactant may be added to the system during or after the proteolysis treatment. The surfactant may be an anionic surfactant and/or a nonionic surfactant. Examples of the anionic surfactant include carboxylic acid surfactants, sulfonic acid surfactants, sulfuric ester surfactants, and phosphoric ester surfactants. Examples of the nonionic surfactant include polyoxyalkylene ether surfactants, polyoxyalkylene ester surfactants, polyhydric alcohol aliphatic ester surfactants, sugar fatty acid ester surfactants, and alkyl polyglycoside surfactants. The surfactant is preferably added in an amount from 0.001 to 10% by weight based on the amount of the natural rubber latex.

The deproteinized natural rubber obtained by the foregoing purification preferably has at least a nitrogen content of less than 0.02%, i.e., being substantially free from any protein. In the deproteinized natural rubber having a nitrogen content of the range specified above, not only water-soluble proteins but also proteins bonded to natural rubber molecules have been decomposed and removed away by protease or the like. It is also preferred that the deproteinized natural rubber is deproteinized to such a level that a raw rubber film prepared therefrom exhibits no absorption at a wavelength of 3,280 $cm^{-1}$ in the infrared absorption spectrum, which is characteristic to polypeptides.

The protein content in a natural rubber has normally been represented by 6.3 times the nitrogen content (N%) determined by Kjeldahl method. In the case of a fresh natural rubber latex (field latex), it is normally from about 3 to 5% by weight (about 0.5 to 0.8% by weight as N%) based on the solid content. In the case of a commercially available purified latex and raw rubber (smoked sheet rubber), it is about 2% by weight or more (about 0.3% by weight as N%).

It has been revealed that, in the case of highly purified natural rubbers, the protein content thereof cannot be accurately estimated based on the nitrogen content thereof. This is because of the fact that there are proteins that bond to rubber molecules and, even when these proteins have been hydrolyzed, amino acid residues or short chain peptide molecules remain, bonding to the rubber molecules.

In general, it is known that a natural rubber is a mixture of a high molecular component having a molecular weight of from 1,000,000 to 2,500,000 and a low molecular component having a molecular weight of from 100,000 to 200,000. It is assumed that the low molecular components are bound with each other via abnormal groups contained in the natural rubber and branched, thereby forming the high molecular components. When an amino acid molecule (i.e., a nitrogen atom of an atomic weight of 14) is bound to one molecule of a low molecular weight rubber molecule of a molecular weight of 100,000 which has been seemingly formed by inherent biosynthesis, the nitrogen content becomes 0.014%. It is therefore considered that the nitrogen content corresponding to this amount is not eliminated but remains. Accordingly, it is understood that even a natural rubber from which proteins have completely been eliminated has a residual nitrogen content of less than 0.02%.

In order to confirm the removal of protein more accurately, an analytical method by the infrared absorption spectrum is preferred. Based on the measurement of the infrared spectra of natural rubbers from which proteins have been eliminated at various levels with the use of a Fourier transform infrared spectrometer and comparison of the results thereof with the infrared absorption spectra of peptides reported by Nakamura et al. (as disclosed in Biopolymers, 26, 795), it has been clarified that after eliminating proteins, an absorption at 3280 $cm^{-1}$ assignable to polypeptides disappears, though an absorption at 3315 to 3320 $cm^{-1}$ assignable to the group of >N—H in short-chain peptides or amino acids binding to rubber molecules remains.

In the present invention, a metallic catalyst is used to accelerate the air oxidation of the deproteinized natural rubber. Preferred examples of metal species of the catalyst include cobalt, copper, iron and the like. These metal species may be used in the form of a chloride or salt or a complex with an organic compound. Among them, cobalt catalysts such as cobalt chloride, cobalt acetyl acetonate and cobalt naphthenate are preferred.

The organic solvent to be used in the present invention may be any organic solvent so long as it does not react with the rubber, is hardly oxidized and dissolves the rubber therein. For example, various hydrocarbon solvents, aromatic hydrocarbon solvents, organic halogen solvents, etc. may preferably be used. Examples of the hydrocarbon solvent include hexane, and gasoline. Examples of the aromatic hydrocarbon solvent include toluene, xylene, and benzene. Examples of the organic halogen solvent include chloroform, and dichloromethane. Among them, aromatic hydrocarbon solvents such as toluene is preferred. These organic solvents may be used in admixture with an alcohol.

The deproteinized natural rubber is dissolved into an organic solvent so as to give a concentration of from 1 to 30% by weight, preferably from 1 to 10% by weight, more preferably from 2 to 5% by weight, based on the weight of the resulting solution, and the resulting solution is subjected to the oxidation reaction. If the concentration of the deproteinized natural rubber falls below the range specified above, it is economically disadvantageous. On the contrary, if the concentration of the deproteinized natural rubber exceeds the range specified above, the viscosity becomes too high, which makes difficult, bringing the deproteinized natural rubber into uniform contact with air.

The metallic oxidation catalyst may be used by dissolving or dispersing it into the solution of the deproteinized natural rubber. The addition amount of the metallic oxidation catalyst is preferably from 0.05 to 5% by weight, more preferably from 0.1 to 1% by weight, based on the weight of the deproteinized natural rubber. If the addition amount of the metallic oxidation catalyst falls below the range specified above, the rate of air oxidation is too low, thus not practical. On the contrary, if the addition amount of the metallic oxidation catalyst exceeds the range specified above, it causes other difficulties such as the difficulty of removing the catalyst after the reaction is completed.

The oxidation reaction is preferably carried out in such a manner that the solution is brought into uniform contact with air. The method for bringing the solution into uniform contact with air is not specifically limited. For example, it may easily be accomplished by shaking the solution in a shaking flask.

The air oxidation is normally effected at a temperature of from room temperature to 100° C. However, the reaction temperature is not specifically limited. The reaction is normally completed within 1 to 3 hours.

After the reaction, the reaction product is separated from the reaction solution for purification. Since the metallic oxidation catalyst remains in the reaction solution even after the reaction, it is preferred that the reaction solution is poured into an alcohol (e.g., methanol) solution containing an acid (e.g., hydrochloric acid) in a large excess amount against the metallic ions, whereby only the rubber content is precipitated and thus purified.

The present invention will be further described in the following examples, but the present invention should not be construed as being limited thereto.

EXAMPLES 1–11

To 50 ml of a 2% (W/V) toluene solution of a deproteinized natural rubber which has a nitrogen content of 0.01% and wherein a film obtain therefrom exhibits no absorption at a wavelength of 3,280 cm$^{-1}$ in the infrared absorption spectrum was added a metallic oxidation catalyst specified in Table 1 in an amount (% by weight) specified in Table 1. The resulting mixture was charged into a 300-ml shaking flask, and then shaken in a shaking constant-temperature water bath at 65° C. at a shaking amplitude of 2 cm and a shaking frequency of 135 times/min. for a predetermined period of time. The reaction product was then poured into a cool methanol containing hydrochloric acid in a 10-times amount of the metallic ion to separate the rubber content therefrom. The rubber content thus separated was then dissolved in toluene and the resulting toluene solution was poured into a cool hydrochlorically-acidified methanol for reprecipitating and purifying the rubber content. Thus a depolymerized natural rubber was obtained.

EXAMPLE 12

To 50 ml of a 2% (W/V) toluene solution of the same deproteinized natural rubber as used in Examples 1 to 11 was added 10 mg (1% by weight based on the rubber content) of cobalt acetylacetonate. The mixture was charged into a 200-ml round flask installed in a constant-temperature water bath at 65° C. The mixture was then allowed to react while minute air bubbles were being blown thereinto at a rate of 1 l/min. through a porous glass nozzle located in the mixture for a period of time specified in Table 1. The reaction product was then subjected to purification in the same manner as in Example 1 to obtain a depolymerized natural rubber.

COMPARATIVE EXAMPLE 1

To 50 ml of a 2% (W/V) toluene solution of a commercially available pale crepe having a nitrogen content of 0.38% was added 10 mg (1% by weight based on the rubber content) of cobalt acetylacetonate. The mixture was charged into a 300-ml shaking flask and then shaken in a shaking constant-temperature water bath at 65° C. at a shaking amplitude of 2 cm and a shaking frequency of 135 times/min. for a predetermined period of time. The reaction product was then poured into a cool methanol containing hydrochloric acid in a 10-times amount of the metallic ion to separate the rubber content. The rubber content thus separated was then dissolved in toluene and the resulting toluene solution was poured into a cool hydrochlorically-acidified methanol for reprecipitating and purifying the rubber content. Thus a depolymerized natural rubber was obtained.

COMPARATIVE EXAMPLE 2

A depolymerized natural rubber was prepared in the same manner as in Comparative Example 1 except that a commercially available deproteinized natural rubber having a nitrogen content of 0.07% was used instead of the pale crepe.

COMPARATIVE EXAMPLE 3

To 200 ml of a 5% (W/V) toluene solution of the same deproteinized natural rubber as used in Examples 1 to 11 were added 50 ml of methanol and 10 ml of a 30% aqueous hydrogen peroxide. The volumetric ratio of toluene/methanol/aqueous hydrogen peroxide was 20/5/1. The mixture was then irradiated with ultraviolet rays from a 100-W high voltage mercury vapor lamp. The reaction was effected at 10° C., which was controlled by passing cool water of 10° C. through a cooling jacket. The reaction product was then subjected to purification in the same manner as in the Examples to obtain a depolymerized natural rubber.

EVALUATION TEST

The depolymerized natural rubbers thus obtained were visually observed for form. Further, these depolymerized natural rubbers were measured for [η], Mn, Mw and Mw/Mn. The results are set forth in Table 1.

TABLE 1

| Example No. | Kind of Catalyst | Reaction Conditions | | | Properties of Product | | | | |
|---|---|---|---|---|---|---|---|---|---|
| | | Amount of catalyst (%) | Temperature (°C.) | Time (hr.) | Form | [η] | Mn (× 10³) | Mw (× 10³) | Mw/Mn |
| Example 1 | CoA | 1 | 65 | 2 | Liquid | 0.53 | 19 | 50 | 2.6 |
| Example 2 | CoA | 1 | 65 | 5 | Liquid | 0.31 | 15 | 37 | 2.5 |
| Example 3 | CoA | 1 | 65 | 10 | Liquid | 0.18 | 10 | 25 | 2.5 |
| Example 4 | CoA | 1 | 65 | 15 | Liquid | 0.18 | 6.6 | 15 | 2.3 |
| Example 5 | CoA | 0.5 | 65 | 5 | Liquid | 0.35 | 11 | 29 | 2.6 |
| Example 6 | CoA | 5 | 65 | 5 | Liquid | 0.37 | 14 | 29 | 2.1 |
| Example 7 | CoA | 1 | 40 | 15 | Liquid | 0.20 | 5.0 | 11 | 2.2 |
| Example 8 | CoN | 1 | 65 | 15 | Liquid | 0.21 | 7.1 | 16 | 2.3 |
| Example 9 | CoCl₂ | 1 | 80 | 64 | Liquid | 0.35 | 12 | 27 | 2.6 |
| Example 10 | CuCl₂ | 1 | 80 | 64 | Liquid | 0.50 | 30 | 77 | 2.6 |
| Example 11 | FeCl₂ | 1 | 80 | 64 | Liquid | 0.80 | 45 | 122 | 2.7 |
| Example 12 | CoA | 1 | 65 | 10 | Liquid | 0.15 | 4.6 | 15 | 3.2 |
| Comparative Example 1 | CoA | 1 | 65 | 30 | Solid | — | — | — | — |
| Comparative Example 2 | CoA | 1 | 65 | 30 | Semisolid | — | — | — | — |
| Comparative Example 3 | None | — | 10 | 30 | Liquid | 0.15 | 3.2 | 13 | 4.2 |

Note:
CoA: Cobalt acetylacetonate
CoN: Cobalt naphthenate

All the depolymerized natural rubbers obtained in the Examples were almost colorless and odorless liquid rubbers having a nitrogen content of 0.01% or less.

On the contrary, neither Comparative Example 1 nor Comparative Example 2 gave a liquid rubber. Comparative Example 3 gave a liquid rubber. However, $C^{13}$NMR analysis of the product showed that cis-1,4 chain units constituting the main chain had been isomerized to trans-1,4 structure in a proportion of 1 per 290 units and had been epoxidized in a proportion of 1 per 40 units.

It was made clear from $C^{13}$NMR analysis that the liquid rubbers of the present invention obtained in the Examples had cis-1,4-chain units epoxidized in a proportion of 1 per about 80 units, approximately half that of Comparative Example 3. These liquid rubbers had a number-average molecular weight Mn of 6,600 as determined by gel permeation chromatography (GPC) and thus were pentanonacontamers. It can thus be judged that these liquid rubbers each contain epoxy groups in a proportion of about 1 per one molecular chain. As a result of $C^{13}$NMR of these liquid rubbers, no isomerization had been found in the isoprene chain, demonstrating that a high cis structure characteristic of natural rubbers had been maintained.

The examples of the present invention were essentially different from the Comparative Examples for the following points of view. Namely, the depolymerized natural rubbers obtained in the Examples of the present invention were confirmed to contain formyl group bonded to one carbon in C=C bond in the molecular chain. This means that the air oxidation has caused the main chain to be decomposed to a carbonyl group at one end and a formyl group at the other but the formyl group has then been re-bonded to the main chain due to aldol condensation reaction. From the fact that no formyl group has been found at the ends of the product and the amount of the aldol-condensed group is 1 per molecular chain of liquid rubber, it can be judged that the reaction product according to the present invention mainly composed of a telechelic liquid rubber terminated by ketone at both ends thereof.

Under the conditions where the rubber solution is vigorously shaken so as to bring the rubber solution into uniform contact with air, liquid rubbers having a molecular weight distribution as narrow as 3 or more, as calculated in terms of Mw/Mn, which had not been attained in the prior art technique, was attained.

As mentioned above, the depolymerized natural rubber of the present invention is free of odor or color characteristic to natural rubbers and causes no immediate allergy induced by protein. Thus, the depolymerized natural rubber of the present invention is suitably applied for articles used closely with the human body, such as an adhesive and for transparent products.

Further, the depolymerized natural rubber of the present invention contains about one epoxy group per one molecular chain and its isoprene chain maintains a high cis structure which is the same as in natural rubbers. Thus, the depolymerized natural rubber of the present invention can be provided with the same physical properties as ordinary vulcanized rubbers.

Moreover, the depolymerized natural rubber of the present invention comprises as a main component a telechelic liquid rubber containing a C=C bond, one carbon atom of which is substituted by formyl group, produced by aldol condensation, per one molecular chain, and the both ends of the molecular chain are terminated by ketone groups. Thus, the depolymerized natural rubber of the present invention can be formed into a three-dimensional network structure with the use of an appropriate crosslinking agent (chain extender).

In accordance with the process for the preparation of a depolymerized natural rubber according to the present invention, a deproteinized natural rubber is dissolved in an organic solvent and then air oxidized in the presence of a metallic catalyst, thereby making it possible to easily and efficiently prepare a depolymerized natural rubber having excellent physical properties as mentioned above.

While the invention has been described in detail and with reference to specific embodiments thereof, it will be apparent to one skilled in the art that various changes and modifications can be made therein without departing from the spirit and scope thereof.

What is claimed is:

1. A depolymerized natural rubber, which is a liquid rubber having a number-average molecular weight of from 2,000 to 50,000 obtained by the oxidative, chemical depolymerization of a deproteinized natural rubber.

2. The depolymerized natural rubber of claim 1, wherein said deproteinized natural rubber is substantially free from any protein and has a nitrogen content of less than 0.02%.

3. The depolymerized natural rubber of claim 1, which contains not more than one epoxy group per molecular chain.

4. The depolymerized natural rubber of claim 1, which comprises a telechelic liquid rubber wherein a C=C bond, one carbon atom of which is substituted by formyl group (—CHO) produced by aldol condensation, is contained per one molecular chain and the both ends of the molecular chain are terminated by ketone groups.

5. A process for the preparation of a depolymerized natural rubber, which comprises dissolving a deproteinized natural rubber into an organic solvent which does not react with the rubber so as to give a concentration of from 1 to 30% by weight and then carrying out air oxidation of the resulting solution in the presence of a metallic catalyst.

6. The process of claim 5, wherein said deproteinized natural rubber is substantially free from any protein and has a nitrogen content of less than 0.02%.

7. The process of claim 5, wherein said organic solvent is an aromatic hydrocarbon.

8. The process of claim 5, wherein said metallic catalyst is a cobalt catalyst.

9. The process of claim 5, wherein said air oxidation is carried out by shaking said solution of the deproteinized natural rubber.

10. The process of claim 5, wherein the solvent is selected from the group consisting of hydrocarbon solvents, aromatic hydrocarbon solvents, and organic halogen solvents.

11. The process of claim 5, wherein the air oxidation is carried out at a temperature of from room temperature to 100° C. for 1 to 30 hours.

12. The process of claim 5, wherein the metallic catalyst is selected from the group consisting of cobalt, copper, and iron.

13. A depolymerized natural rubber with is substantially free of odor and color which comprises as a main component, a telechelic liquid rubber containing a C=C bond, one carbon atom of which is substituted by a formyl group, said rubber having a molecular chain with a high cis structure and which is terminated at both ends thereof by ketone groups, said rubber having a molecular weight of 2,000 to 50,000, a molecular weight distribution of at least 3, calculated as a ratio of Mw/Mn, and obtained by the oxidative, chemical depolymerization of a deproteinized natural rubber.

14. The depolymerized natural rubber of claim 13, wherein the liquid rubber has a number-average molecular weight of from 2,000 to 50,000, and is obtained by the depolymerization of a deproteinized natural rubber.

15. The depolymerized natural rubber of claim 14, wherein the protein content in the natural rubber is about 2 to 5% by weight, based on the solid content thereof.

16. The depolymerized natural rubber of claim 13, wherein the liquid rubber has cis 1,4-chain units epoxidized in a proportion of 1 per about 80 units.

17. An article of manufacture which is used in close association with the human body which comprises a depolymerized natural rubber containing as a main component, a telechelic liquid rubber containing a C=C bond, one carbon of which is substituted by a formyl group, said rubber having a molecular chain with a high cis structure and which is terminated at both ends thereof by ketone groups, said rubber having a molecular weight distribution of at least 3, calculated as a ratio of Mw/Mn.

18. The article of manufacture of claim 17, wherein said article is an adhesive.

19. The article of manufacture of claim 17, wherein said article is a transparent material.

20. The process of claim 5, wherein the metallic oxidation catalyst is present in an amount of from 0.05 to 5% by weight based on the weight of the deproteinized natural rubber.

* * * * *